United States Patent [19]

Sato et al.

[11] Patent Number: 5,479,889
[45] Date of Patent: Jan. 2, 1996

[54] MULTI-INTAKE VALVE ENGINE

[75] Inventors: Hiromi Sato; Toyokazu Iwasa; Akihiro Ohya; Hiroshi Nathume, all of Fujisawa, Japan

[73] Assignee: Isuzu Motors Limited, Tokyo, Japan

[21] Appl. No.: 221,341

[22] Filed: Mar. 31, 1994

[30] Foreign Application Priority Data

| Apr. 5, 1993 | [JP] | Japan | 5-078275 |
| Apr. 5, 1993 | [JP] | Japan | 5-078276 |
| Apr. 16, 1993 | [JP] | Japan | 5-090170 |

[51] Int. Cl.$^6$ ............................................. F02B 31/00
[52] U.S. Cl. ............................ 123/308; 123/188.14
[58] Field of Search ....................... 123/188.14, 308, 123/432

[56] References Cited

FOREIGN PATENT DOCUMENTS 0281015  7/1988  European Pat. Off. .

OTHER PUBLICATIONS

Patent Abstracts of Japan; Appln No. 60-141293 published Jun. 1, 1987.
Patent Abstracts of Japan; Appln No. 54-110105 published Jul. 4, 1981.
Patent Abstracts of Japan; Appln No. 58-88222 published Mar. 12, 1984.

*Primary Examiner*—Henry C. Yuen
*Assistant Examiner*—Erick Solis
*Attorney, Agent, or Firm*—Thomas K. Ziegler

[57] ABSTRACT

The engine has first and second intake ports for one cylinder (combustion chamber). The intake ports are formed in a cylinder head and extend substantially parallel to each other. Downstream ends of the first and second ports open to a combustion chamber defined in the cylinder upon a compression stroke. The first intake port is a helical port to generate and supply a first swirl into the combustion chamber. The second intake port has a recess in its wall near its downstream end to reverse the flow direction of the air in the second intake port so as to generate and supply a second swirl into the combustion chamber. The recess in the second intake port reverses the air flow direction before the intake air in the second intake port enters the combustion chamber, so that the second swirl flows in the same direction as the first swirl in the combustion chamber. Therefore, a single strong swirl is obtained in the combustion chamber.

16 Claims, 10 Drawing Sheets

MULTI-INTAKE VALVE ENGINE

BACKGROUND OF THE INVENTION

1. Technical Field

The present invention relates to an engine having first and second intake ports for each cylinder (or combustion chamber), and more particularly to improvements to intake ports of such an engine.

2. Background Art

If a plurality of intake ports is formed for a single cylinder (or combustion chamber), the total effective area for air intaking is enlarged and various advantages arise. Most typical engines having a plurality of intake ports are three-valve engines (two intake ports and one exhaust port) and four-valve engines (two intake ports and two exhaust ports).

Figure 21:
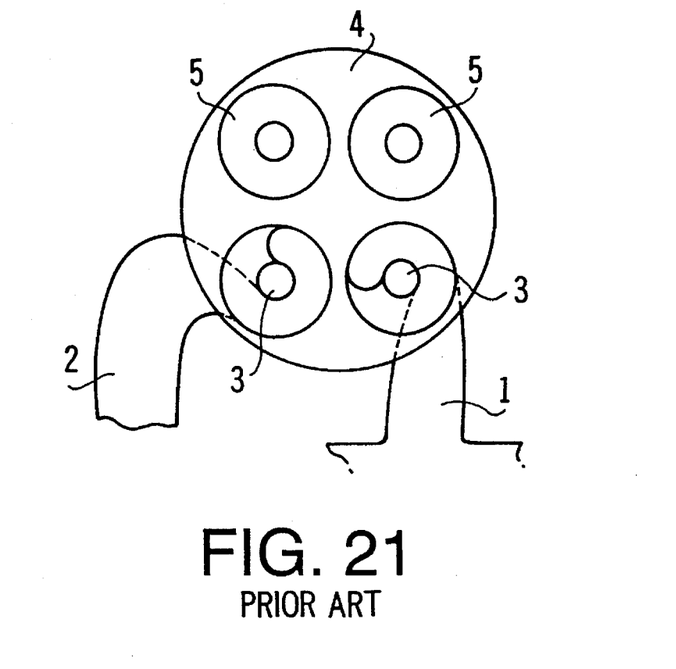
FIGS. 21 and 22 illustrate conventional intake port arrangements, respectively.

One example of the four-valve engine is disclosed in Japanese Patent Application, Publication No. 50-135421. FIG. 21 of the accompanying drawings is one figure of this publication. As shown, two intake ports 1 and 2 extend parallel to each other and perpendicular to a direction of a crankshaft (not shown). The first intake port 1 is provided for inertia supercharging and the second intake port is provided for normal air intake. The intake air entering the composition chamber 4 from the first intake port 1 and that from the second intake port 2 are different in speed and pressure. Thus, when these two intake airs enter a single combustion chamber 4, they intervene with each other in the combustion chamber 4 and a turbulence occurs. Because of the turbulence, the intake air mixes with a fuel in a desired manner. As a result, a combustion of less HC, CO and smokes is realized. Numeral 3 designates an intake valve and 5 designates an exhaust valve.

Figure 22:
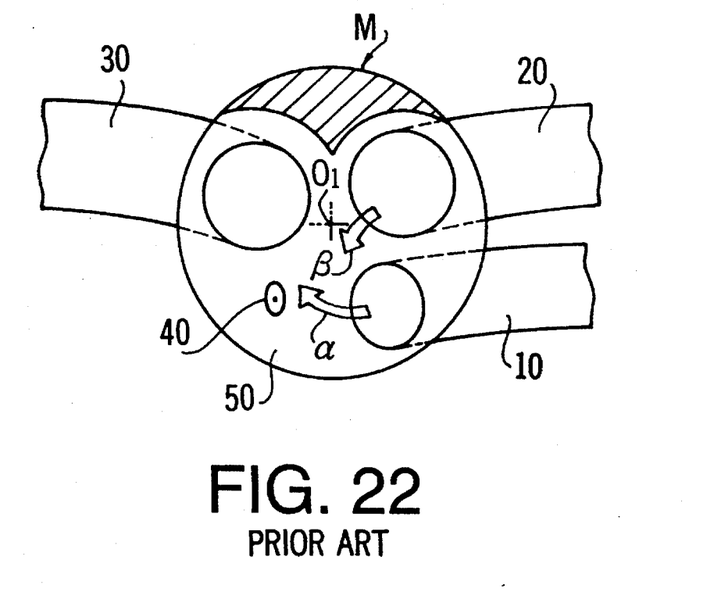

An example of three-valve engine is seen in Japanese Utility Model Application, Publication No. 59-192625. A fundamental teaching of this publication is illustrated in FIG. 22 of the accompanying drawings. As shown, two intake ports 10 and 20 extend parallel to each other and perpendicular to a crankshaft direction (not shown)to generate first and second swirls "alpha" and "beta", respectively. Means M is provided for deviating the flow direction of the second swirl "beta" generated in the second intake port 20. The second swirl "beta" is deviated such that the second swirl "beta" from the second intake port 20 and the first swirl "alpha" from the first intake port 10 flow in the same direction in a combustion chamber 50. The swirl deviation means M is a stationary shroud in FIG. 22, but it is a masking plate in another embodiment. Incidentally, numeral 30 designates an exhaust port, 40 designates a spark plug and 01 designates a center off the combustion chamber 50. If the swirl deviation means M is not provided, the first and second swirls rotate in opposite directions in the combustion chamber 50. In other words, these swirls intervene with each other in the combustion chamber 50 and hey are weakened by the opposite swirls. If the swirl is weak in the combustion chamber. a large amount off smoke results in the case of diesel engines.

The above-described conventional arrangements have the following problems:

(i) The layout of intake ports in the arrangement of Japanese Patent Application, Publication No. 50-135421 is complicated and the cylinder head must be designed with larger dimensions; and (ii) The air flow direction adjusting means in Japanese Utility Model Application, Publication No. 59-192625 employs a masking plate or a stationary shroud which becomes an obstacle to the second swirl and raises throttling loss. Therefore, the intake efficiency raised by a plurality of intake ports is counterbalanced.

SUMMARY OF THE INVENTION

An object of the present invention is to provide a multi-intake valve engine which does not result in a complicated intake port layout, a larger cylinder head and a larger throttling loss while being able to generate a strong swirl in a combustion chamber.

According to one aspect of the present invention, there is provided an engine which was first and second intake ports, the first intake port extending substantially parallel to the second intake port and the first and second ports respectively having openings which open to a cylinder (combustion chamber) in a bottom face of a cylinder head, characterized in that the first intake port is shaped in a helical port to generate and supply a first swirl into the cylinder and the second intake pore has a recess in its wall near its downstream end to reverse the flow direction of the air in the second intake port so as to generate and supply a second swirl into the cylinder which flows in the same direction as the first swirl. A combustion chamber is defined in the cylinder as a piston arises during a compression stroke.

The recess in the second intake port reverses the air flow direction of the intake air before the intake air in the second intake port enters the cylinder. This air s supplied to the cylinder as the second swirl and the second swirl rotates in the same direction as the first swirl generated by the first intake port. Therefore, the two swirls from the two intake ports rotate in the same direction and a strong combined swirl generated in the cylinder (or combustion chamber). This arrangement can be made without complicating the valve layout, enlarging the cylinder head and raising the throttling loss.

When the intake air enters in the recess, part of the incoming intake air may conflict with the already reversed flow of air. Specifically, the intake air is reversed clockwise (normal swirl direction) in the recess so that the reversed intake air may collide with the incoming intake air in the right half of the recess. To overcome this problem, the second intake port may be offset to the left (or toward the first intake port), with the downstream end opening of the second intake port being fixed. Most of the intake air flowing in the offset intake port flows into the left half of the recess. Therefore, the incoming intake air does not collide with the reversed intake in the recess.

Further, the second intake port may be bent toward the first intake port such that the intake air in the second intake port does not intervene with the intake air in the recess. This modification also causes the incoming intake air to flow into the left half of the recess. This further insures a strong swirl in the cylinder.

Alternatively, a projection may be formed on a lateral wall of the second intake port to deviate the flowing direction of the intake air in the second intake port. The deviated flow of air is directed to the left half of the recess so that the intake air does not intervene with the reversed air in the recess. Thus, a strong swirl is obtained in the cylinder. In this case, since the second intake port extends generally straight as originally, a sufficient space for a glow plug which is located between the first and second intake port is ensured (if the second intake port is bent toward the first intake port, the space for the glow plug becomes smaller). The glow plug is preferably located between the first and second intake ports to insure a satisfactory combustion during a cold start-up of the engine.

DETAILED DESCRIPTION OF THE PREFERRED EMBODIMENTS

Now, preferred embodiments of the present invention will be described with the accompanying drawings.

First Embodiment:

First, a first embodiment will be explained with reference to FIGS. 1 to 12.

Figure 1:
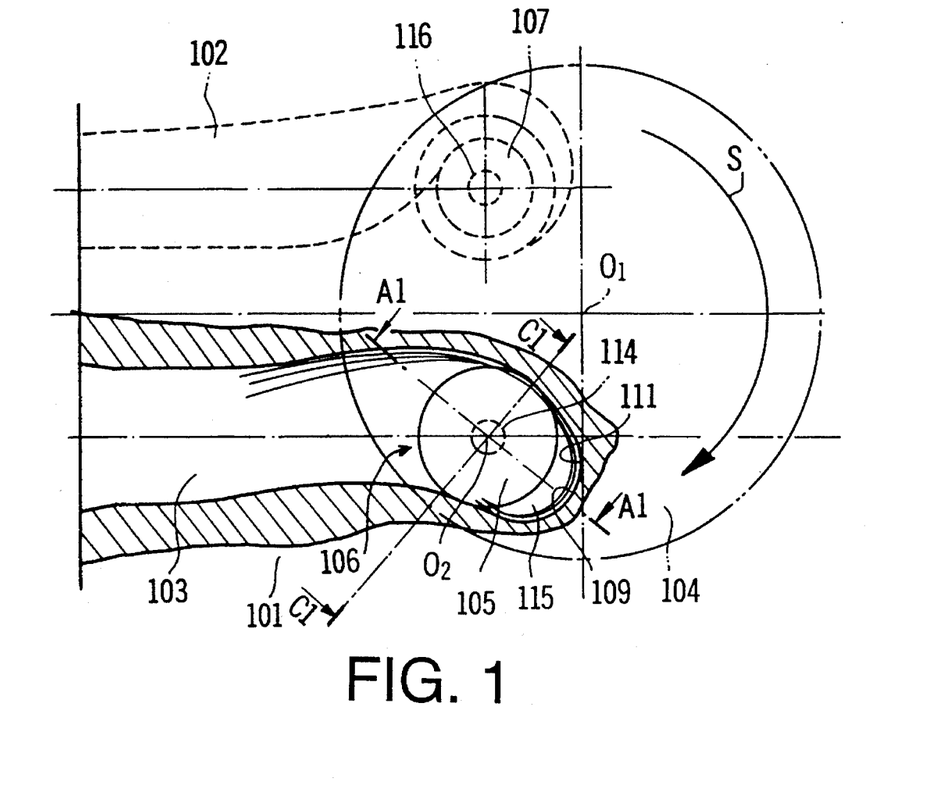
FIG. 1 is a partially sectioned view of a cylinder head to which teaching of the present invention is embodied.

Referring to FIG. 1, a cylinder head 101 has a first intake port 102 extending in a direction perpendicular to the longitudinal direction of a crankshaft (not shown) or the direction of cylinders arranged in an engine and a second intake port 103 extending substantially parallel to the first intake port 102. The first intake port 102 has a helical shape (or is a helical port) to generate a clockwise swirl S in a cylinder 104 (referred to as "normal swirl") as an air (intake air or combustion air) is taken into the cylinder 104. The second intake port 103 is a straight port and has a swirl generator 106 at its downstream end (in the vicinity of a downstream end opening 105 of the second intake port 103). The swirl generator 106 has a tangential shape to cause the intake air to enter and rotate in the cylinder 104. The second intake port exit opening 105 opens to the cylinder 104. Numeral 107 designates a downstream end opening of the first intake port 102. The exit opening 107 of the first intake port 102 opens downstream of the exit opening 105 of the second intake port 103 in the flow direction of the normal swirl S. Numeral 116 designates a first intake valve for the first intake port 102, "01" designates a center of the cylinder 104 and "02" designates the center of the second intake port opening 105.

The swirl generator 106 has a recess 109 to correct (or reverse) the direction of the intake air entering the swirl generator 106. Specifically, the recess 109 is formed to cause the intake air to flow as a normal swirl S in the cylinder 104.

Figure 2:
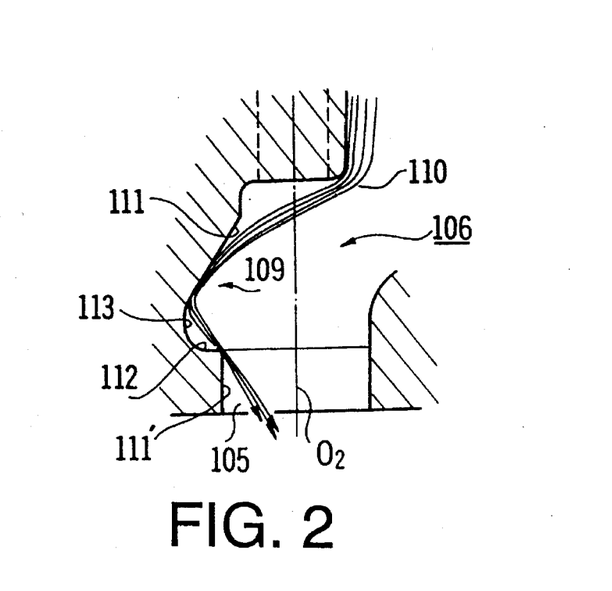
FIG. 2 is a sectional view taken along the line A1—A1 in FIG. 1, showing a swirl, generator.

Referring to FIG. 2, the recess 109 is formed by making a depression in a wall of the second intake port 103 near its downstream end. The recess 109 is generally defined by a lateral wall 111 continuous from a swirl generator entrance 110, a bottom wall 112 inwardly and horizontally extending to a downstream end wall 111' and a curved wall 113 connecting the bottom wall 112 with the lateral wall 111. The recess 109 terminates before the exit opening 105 of the second intake port 103 (it terminates leaving the downstream end wall 111'). A depth E of the recess 109 (FIGS. 3 and 4) increases in the direction which the intake air flows in the swirl generator 106. Specifically, the recess 109 is shallowest at the beginning of the lateral wall 111 and deepest at the end 112 of the recess 109 (FIG. 2). In other words. the recess 109 is similar to a right-angled triangle in section.

According to this construction, as the intake air flows in the recess 109, its flowing direct[on is reversed (from a reverse swirl direction to a normal swirl direction). As a result, when the intake air leaves the second intake port 103 from its opening 105 and enters the cylinder 104, it has become a clockwise swirl.

Next, detail of respective parts will be explained.

Figure 4:
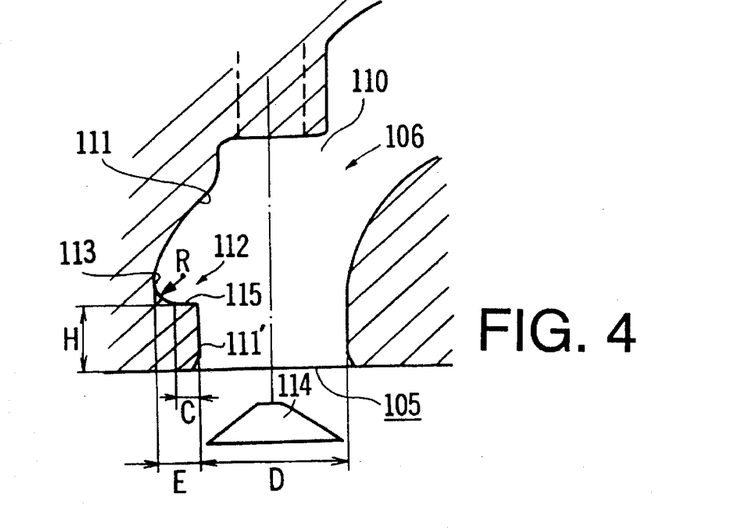
FIG. 4 is a sectional view taken along the line B—B if FIG. 3, showing the same swirl generator as FIG. 2.

Referring first to FIG. 4, a height from the second intake port exit opening 105 to the bottom wall 112 of the recess 109 or a height of the downstream end wall 111' should have an appropriate value since the downstream end wall 111' may hinder the intake air from flowin in the normal swirl direction and further reverse it to the reverse swirl direction.

Figure 3:
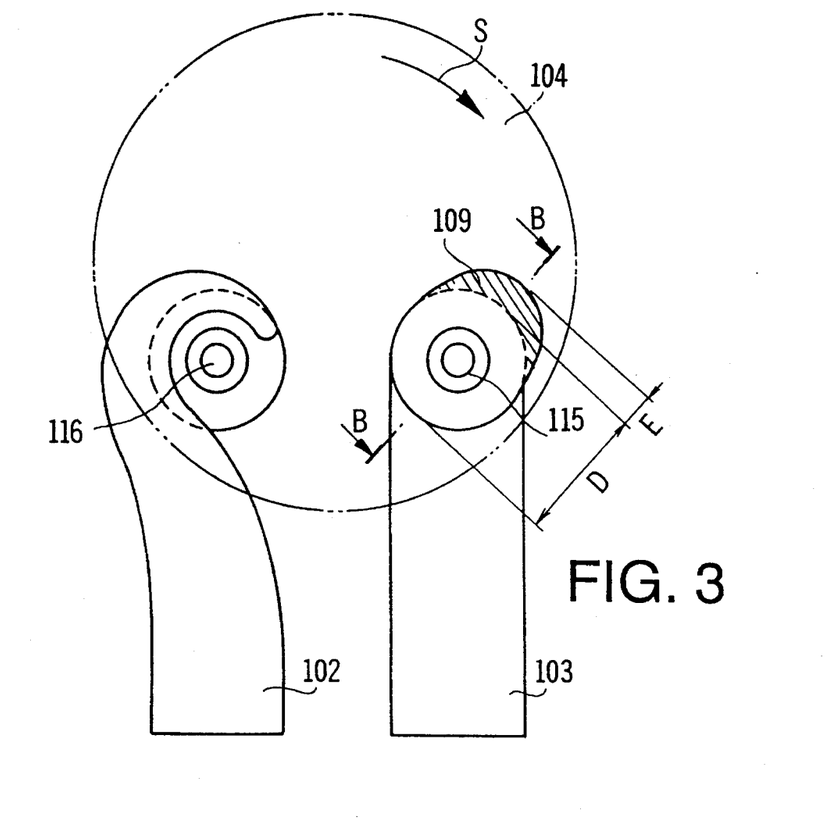
FIG. 3 is a simplified view of the cylinder head shown in FIG. 1.
Figure 5:
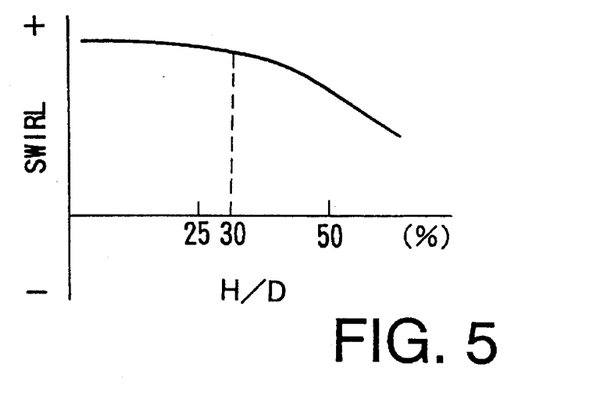
FIG. 5 is a diagram showing relation between swirl ratio and a height of a recess in the swirl generator shown in FIG. 4.

Influence of the height H was evaluated and the result is shown in FIG. 5. As illustrated, when a height-to-diameter ratio H/D ("D" stands for a diameter of the opening 105 of the second intake port 103; FIG. 3) was 30%, the intake air entered the cylinder 104 From the second intake port 108 as a reverse swirl. However, when the H/D was lower than 30% or between 0 and 30%, no reverse swirl was generated in the second intake port 103.

Therefore, the height H of the recess 109 is preferably determined to fall in a scope of 0<H/D<0.3.

It was also found that the bottom wall 112 of the recess 109 raises the swirl ratio. In other words, the bottom wall 112 raises the intensity off the normal swirl leaving from the second intake port 108 and in turn prevents attenuation of the normal swirl S in the cylinder 104. Since the depth of the bottom wall 112 influences the swirl ratio, it is possible to change the swirl ratio and in turn the intensity of the normal swirl S in the cylinder 104 by adjusting the maximum depth of the recess 109.

The swirl ratio (KS) is given by the following equation wherein $N_s$ is a swirl speed (RPMs) around a cylinder center access in a cylinder under a stead state and N is an engine speed (RPM).

Figure 6:
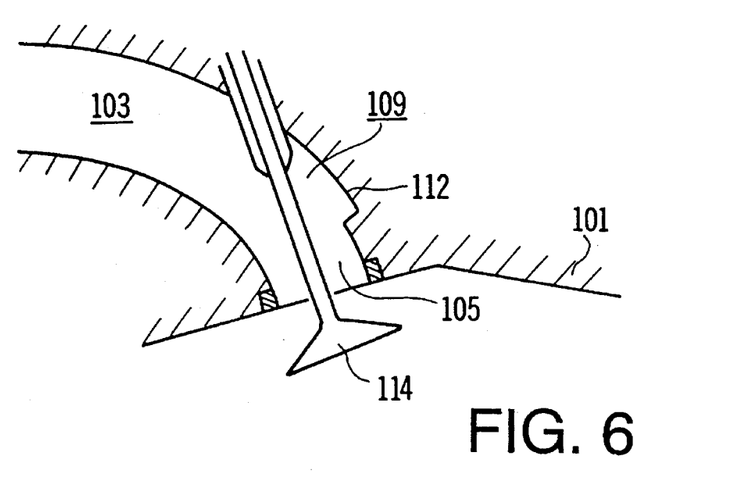
FIG. 6 shows a case where the teaching of the present invention is applied to a pent roof cylinder head.

The illustrated recess 109 may also be applied to a cylinder head 101 shown in FIG. 6. The cylinder head 101 is a so-called pent roof type one; a roof-like concave is formed in the bottom of the cylinder head 101.

Another experiment was carried out on the depth E of the recess 109. The depth E of the recess 109 was changed to find out the influence thereof on the swirl ratio.

Figure 7:
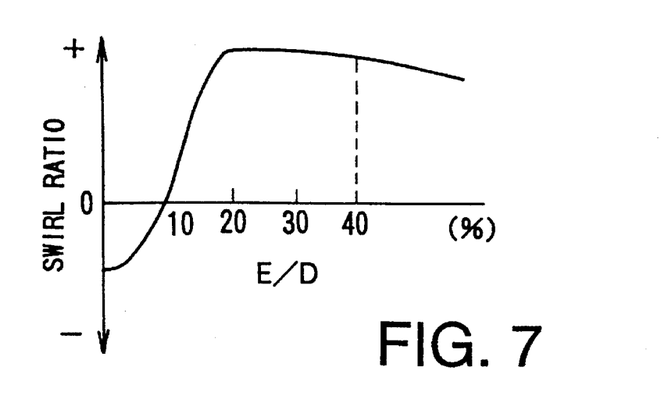
FIG. 7 shows relation between swirl ratio and a depth of the recess shown in FIG. 4.

The result is illustrated in FIG. 7.

As seen in FIG. 7, when an E/D was around 10%, a swirl ratio was "0" (zero) and when the E/D reached 20%, the increase of the swirl intensity stopped. As the E/D exceeded 20%, stagnation occurred in the recess 109. When the E/D exceeded 40%, the swirl intensity apparently dropped due to the stagnation.

This concludes that the preferable depth E of the recess 109 should be determined to satisfy a condition of $0.1 < E/D \leq 0.4$.

Figure 8:
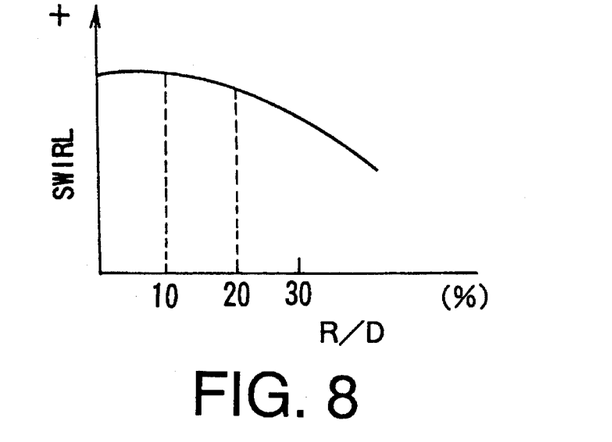
FIG. 8 is a diagram illustrating relation between a swirl ratio and a radius of curvature of the recess shown in FIG. 4.

FIG. 8 shows how the swirl intensity varies with a radius R of the curve 113 (FIG. 4). As illustrated, when an R/D was greater than 30%, a lesser portion of the intake air became a normal swirl S and the ratio of a reverse swirl increased. According to this experiment, it was found that, as shown in FIG. 8, the R/D should be equal to or less than 20% to obtain a strong normal swirl S.

Still another experiment was conducted with the bottom 112 of the recess 109 (FIG. 4). Specifically, when the bottom 112 had a flat portion 115 as illustrated in FIG. 4, a large portion of the intake air was converted to a normal swirl S and the intensity of the normal swirl as generated was sufficiently strong. When the recess 109 did not have a flat portion 115, on the other hand, the intake air flowing toward exit opening 105 of the second intake port 103 was not directed to the flow direction of the normal swirl S due to a vector component of the reverse swirl.

However, simply enlarging the depth C of the flat portion 115 of the recess 109 does not always result in stronger normal swirl. There is an appropriate range. To find out such an appropriate range, another experiment was made. The result is shown in FIG. 9.

Figure 9:
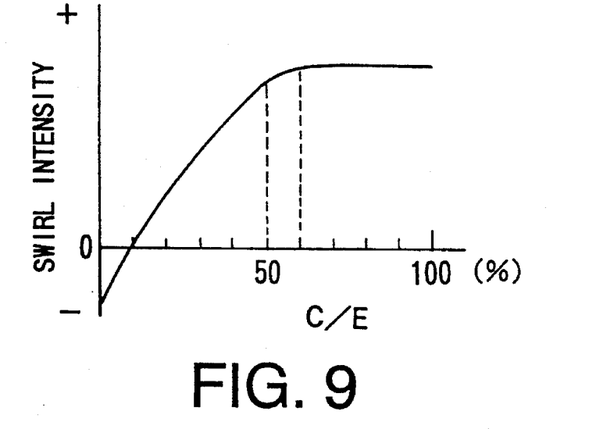
FIG. 9 is a diagram illustrating relation between swirl ratio and the depth of the recess and a flat portion of the recess.

As illustrated in FIG. 9, it was confirmed that when the C/E ratio was below 10%, a reverse swirl was generated in the cylinder 104. The reason will be explained with reference to FIG. 12.

Figure 12:
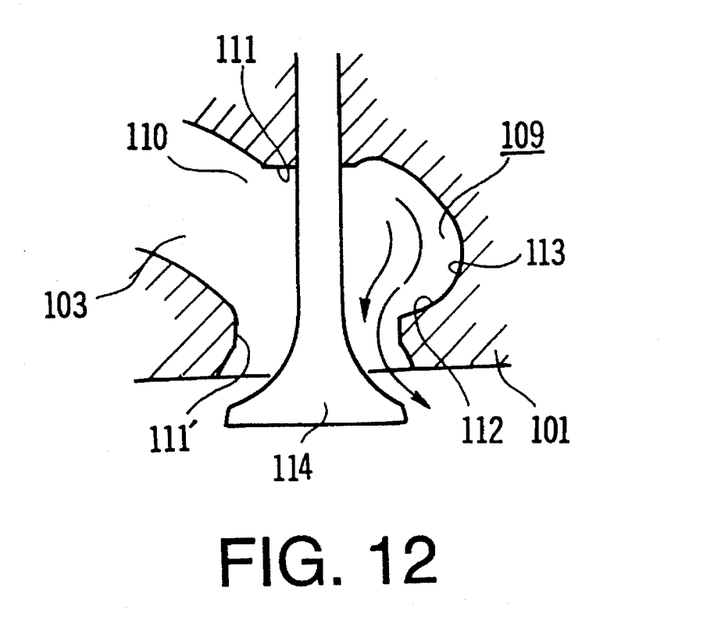
FIG. 12 schematically depicts flow of the intake air in the recess which does not have an appropriate shape.

As shown in FIG. 12, a considerable portion of the intake air is not reversed to a normal swirl in the recess 109 but just flows through the second intake port 103 if the end 112 of the recess 109 hardly has a flat portion. As a result, such a non-reversed intake air attenuates a normal swirl generated by the first intake port 102 in the cylinder 104 when these two flows of air meet (or collide) in the cylinder 104.

Referring back to FIG. 9, when the C/E exceeded 60% i.e., when the end 112 of the recess 109 has a too long flat portion 115, stagnation occurred in the recess 109 and the increase of the swirl intensity stopped.

Therefore, a recommendable range of the C/E is $0.6 > C/E \geq 0.5$. At least, the C/E should be equal to or more than 0.1 to maintain a normal swirl S.

Figure 10:
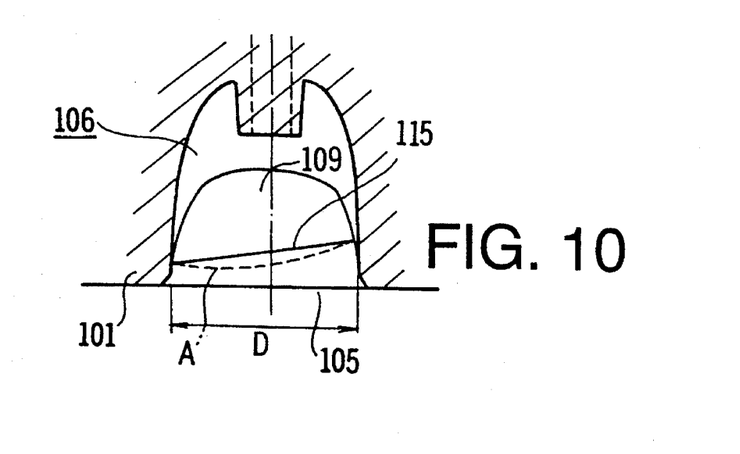
FIG. 10 is a sectional view taken along the line C1—C1 in FIG. 1, showing a case where the flat portion of the recess is inclined or bent downardly.

Referring now to FIG. 10, if the flat portion 115 is inclined, the conversion of the intake air to the normal swirl S proceeds smoothly. Thus, the intake air in the second intake port 103 is converted to a normal swirl S with little attenuation and a strong normal swirl S is introduced to the cylinder 104 From the second intake port 103.

If the flat portion 115 is downwardly curved as indicated by the broken line A in FIG. 10, the attenuation is further reduced.

Next, operations during an air intake stroke will be explained.

Referring back to FIG. 1, as the first and second intake valves 116 and 114 are opened, external air comes into these ports. Then, the intake air is converted to clockwise swirls in the first and second intake ports 102 and 103 respectively so that a strong normal swirl S is generated in the cylinder 104. Because a masking plate or a stationary shroud is not provided, there is no substantial throttling loss during the intake stroke so that a sufficient amount of air is introduced to the cylinder 104.

As may be understood from the above, the intake air should be positively collected into the recess 109 to reverse a substantial amount of intake air to a normal swirl.

Figure 11:
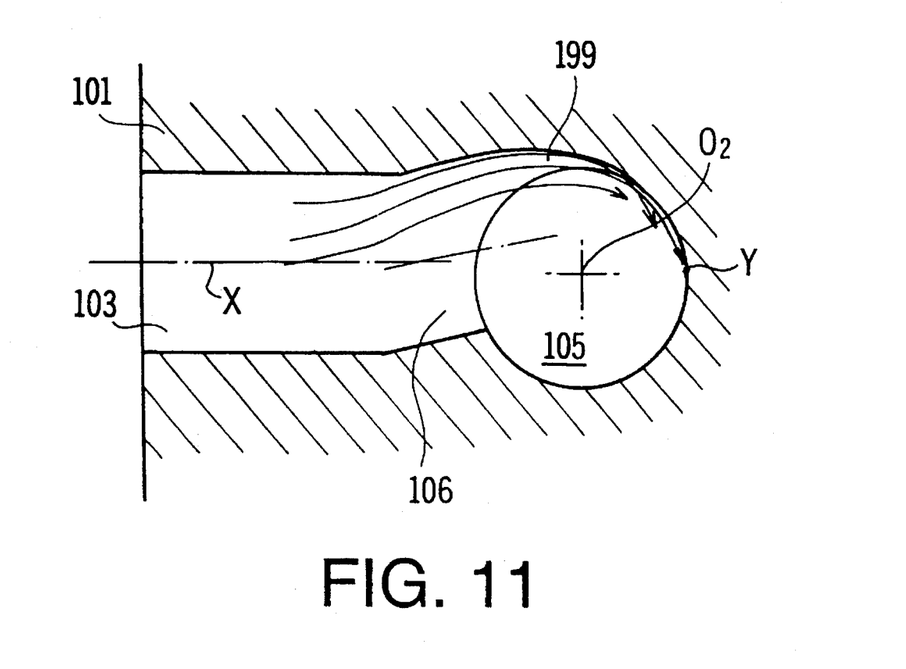
FIG. 11 depicts a modification of a second intake port in which a downstream half of the second intake port is shifted toward a first intake port (to the upward in the illustration) while maintaining location, depth and shape of the recess of FIG. 2.

FIG. 11 shows a modification, in which part of the second intake port 103 is curved or shifted to the left or toward the first intake port 102 (to the upward in the illustration). Because of this shifting, another recess 199 is formed in a lateral wall of the second intake port 103. In FIG. 11, the upstream half of the second intake port 103 and the recess 109 itself are the same as those of FIG. 1. A single-dot line X indicates a center of the second intake port 103. The recess 109 is not illustrated in FIG. 11 for the sake of easier understanding.

If the second intake port 103 has a shape illustrated in FIG. 11, the flow of the intake air is deviated to the left as viewed in the center line X direction (to the upward in FIG. 11) and most of the intake air flows along the second recess 199, as indicated by the arrows. After that, the intake air enters the left half of the recess 109 and flows clockwise along the wall of the swirl generator 106. Then, the intake air Leaves the recess 190 (or enters the cylinder 104) from a point Y of the exit opening 105. In this case, most of the intake air in the second intake port 103 is reversed to a normal swirl S before it enters the cylinder 104.

Second Embodiment:

Now, a second embodiment of the present invention will be described with reference to FIGS. 13–18.

Figure 13:
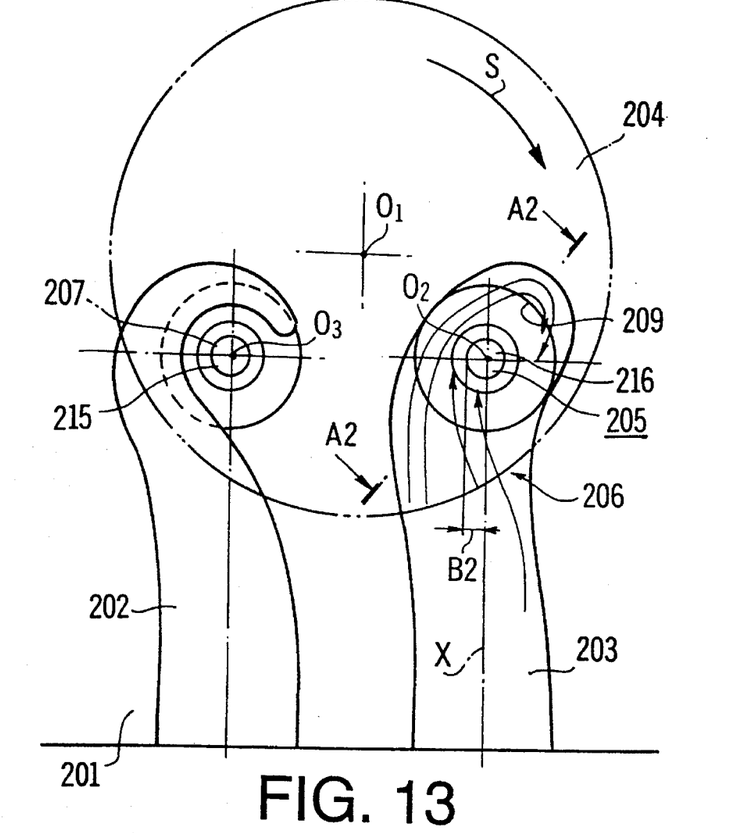
FIG. 13 illustrates a cylinder head according to a second embodiment of the present invention.

Referring to FIG. 13. a cylinder head 201 has a first intake port 202 extending in a direction perpendicular to a longitudinal direction of a crankshaft (not shown) or a direction of cylinders arranged in an engine and a second intake port 203 extending substantially parallel to the first intake port 202. The first intake port 202 has a helical shape (or is a helical port) to generate a clockwise swirl S in a cylinder 204 (referred to as "normal swirl") as an air (intake air or combustion air) is taken into the cylinder 204. The second intake port 203 is a straight port and has a swirl generator 206 at its downstream end (near an exit opening 205 of the second intake port 203). The swirl generator 206 has a tangential shape to cause the intake air to enter and rotate in the cylinder 204. The second intake port exit 205 and a first intake port exit 207 open to the cylinder 204. The first exit opening 207 opens downstream of the second exit opening 205 in the flowing direction of the normal swirl S. "01"

designates a center of the cylinder (or combustion chamber) 204, "02" designates a center of the second intake port opening 205 and "03" designates a center of the first intake port opening 207.

The swirl generator 206 has a recess 209 to correct (or reverse the direction of the intake air entering the second intake port 202. Specifically, the recess 209 is formed to cause the intake air to flow as a normal swirl S in the cylinder 204.

Figure 14:
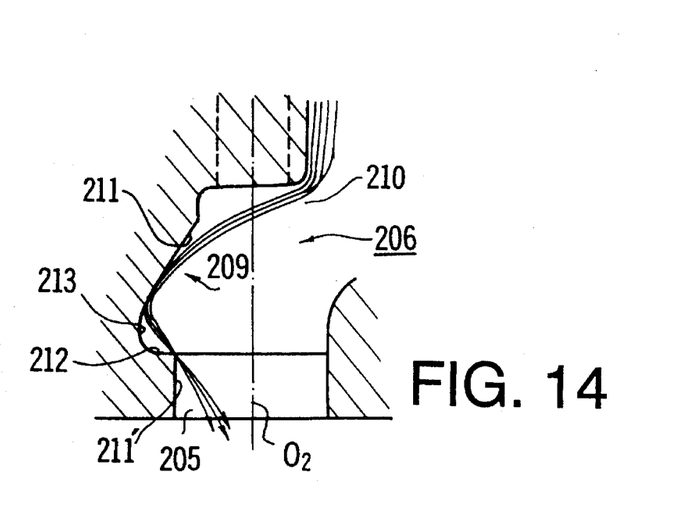
FIG. 14 is a sectional view taken along the line A2—A2 in FIG. 13.

Referring to FIG. 14, the recess 209 is formed by making a depression in a wall of the swirl generator 206 near its downstream end. The recess 209 is generally defined by a lateral wall 211 continuous from the swirl generator entrance 210, a bottom wall 212 inwardly and horizontally extending to a downstream end wall 211' and a curved wall 213 connecting the bottom wall 212 with the lateral wall 211. The recess 209 terminates before the opening 205 of the second intake port 203 (it terminates leaving the downstream end wall 211'). The depth of the recess 209 increases in the direction which the intake air flows in the swirl generator 206. Specifically, the recess 209 is shallowest at the beginning of the lateral wall 211 of the recess 209 and deepest at the end 212 of the recess 209. In other words, the recess 290 is similar to a right-angled triangle in section.

According to this construction, as the intake air flows along the lateral wall 211, the curved wall 213 and the bottom wall 212 of the recess 209, its flowing direction is reversed (from a reverse swirl direction to a normal swirl direction). As a result, the intake air leaves the second intake port 203 from its opening 205 and enters the cylinder 204 in the form of normal swirl S. Therefore, when the first and second intake valves 215 and 216 are opened, an air is taken into the first and second intake ports 202 and 203 respectively and the intake air leaves the intake port 202 and 203 from their openings 207 and 203 in the Form of normal swirl, respectively. Accordingly, a strong normal swirl S is generated in the cylinder 204. Unlike a conventional arrangement, no masking plates or shrouds are provided so that there is substantially no throttling loss in the intake ports. Thus, a sufficient amount of intake air (or combustion air) is introduced to the cylinder 204.

Figure 17:
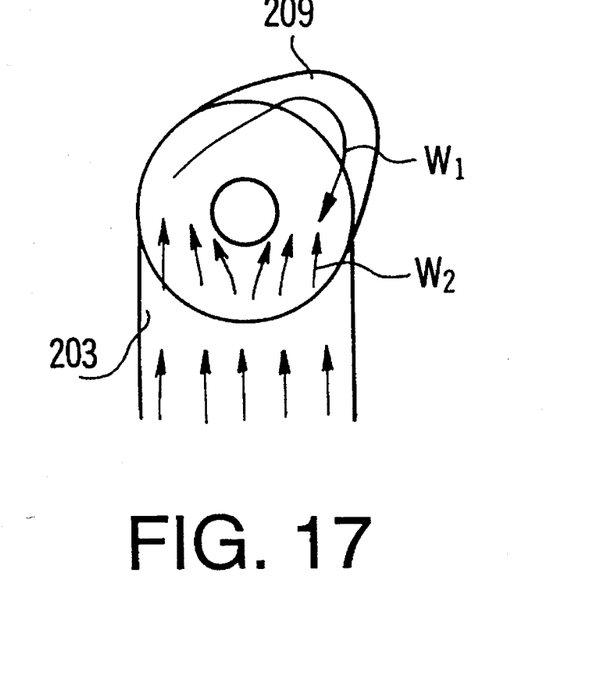
FIG. 17 shows how an intake air flows in the second intake port and a recess shown in FIG. 13.

Meanwhile, relation between flows of the intake air in the second intake port 203 and the recess 209 was studied by the inventors. As illustrated in FIG. 17, the inventors found out that a flow W1 of the intake air which is reversed to a normal swirl direction by the recess 209 is intervened with by a flow W2 of the intake air which flows along a right side wall of the second intake port 203 if the center of the opening 205 coincides with the center of the second intake port 203. In this case, the normal swirl W1 generated by the recess 209 is weakened in the second intake port 203 before it enters the cylinder 204.

To overcome this problem the center of the downstream half of the second intake port 203 is offset toward the first intake port 202 by a predetermined value B2, as illustrated in FIG. 13. It should be noted that the second intake port opening 205 is fixed and only the port 203 is offset. "X" indicates a center line of the downstream half of the second intake port 203.

As the second intake port 203 is offset toward the first intake port 202, the flow W2 of the intake air (FIG. 17) is directed to the left and does not intervene with the flow W1. In experiments, when the offsetting B2 was close to one-third of a diameter of a valve for the second intake port 203, almost all the intake air in the second intake port 203 did not intervene with the air flow W1 and a strong normal swirl S was obtained in the swirl generator 206 of the second intake port 203.

Figure 15:
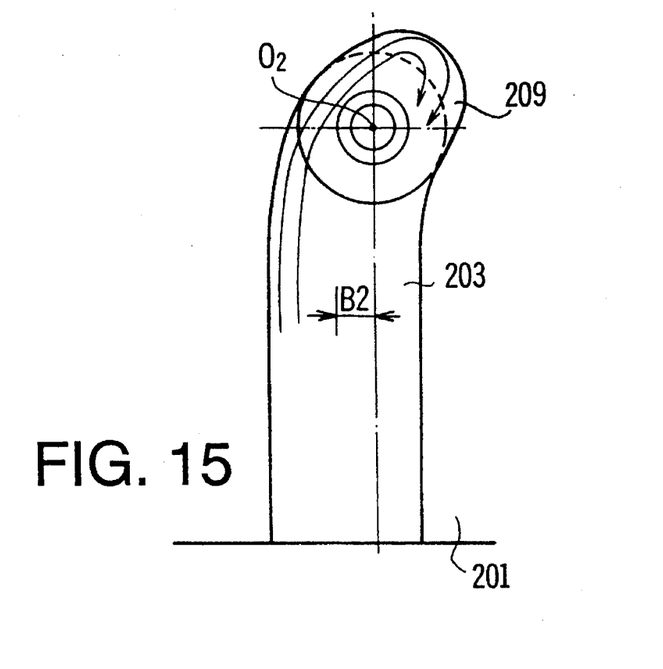
FIG. 15 illustrates a modification of the second intake port shown in FIG. 13.

FIG. 15 shows a modification of the second intake port 203. Specifically, it illustrates a case where the entire second intake port 203 extends straight and is shifted toward the first intake port by a predetermined amount "B2". A strong normal swirl (clockwise swirl) is generated in the recess 203 since most of the intake air is directed to the left half of the recess 209 and it flows clockwise along the wall of the recess 209 in the swirl generator 206.

Figure 16:
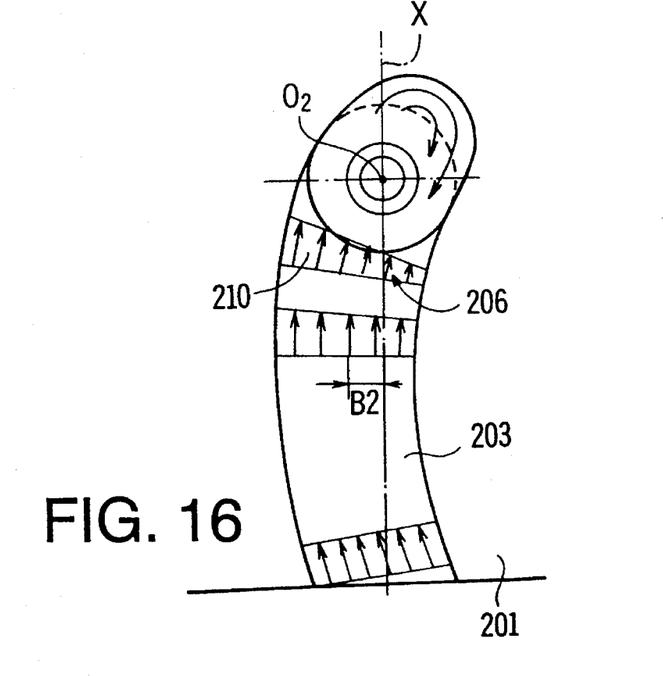
FIG. 16 shows another modification of the second intake port shown in FIG. 13.

FIG. 16 illustrates another modification of the second intake port 203 to generate a further stronger normal swirl S.

In this modification, the entire second intake port 203 shifts to the left by "B2" and curves right. In such a second intake port 203, the intake air flows relatively fast along the left side wall (on the First intake port 202 side) and relatively slow along the right side wall. Thus, the intake air flowing along the left side wall is accelerated in the second intake port 203 and a stronger clockwise swirl (normal swirl) is easy to generate. Although some intake air W2 (FIG. 17) might intervene (or collide) with the normal swirl W1 (reversed flow of air) generated by the recess 209, the normal swirl W1 would not be weakened considerably since the intake air W2 is decelerated as it flows along the right side wall of the second intake port 203. The velocity profile in FIG. 16 shows this. Therefore, a strong swirl is obtained in the cylinder 204.

Figure 18:
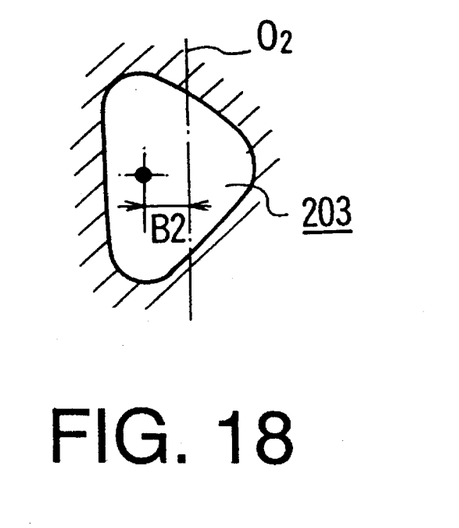
FIG. 18 shows another modification of the second intake port.

Still another modification is illustrated in FIG. 18 which shows a section of a modified second intake port 203. In FIG. 18, a center of gravity of the section of the second intake port 203 is offset to the left from the center axis 02 of the opening 205 by the distance B2. This configuration also results in a strong swirl.

The configuration of the swirl generator 206 (e.g., preferable ranges of H/D, E/D, R/D and C/E) is substantially the same as that of the swirl generator 106 of the first embodiment so that explanation thereof is omitted here.

Third Embodiment:

Next, a third embodiment according to the present invention will be described with reference to FIGS. 19 and 20.

Figure 19:
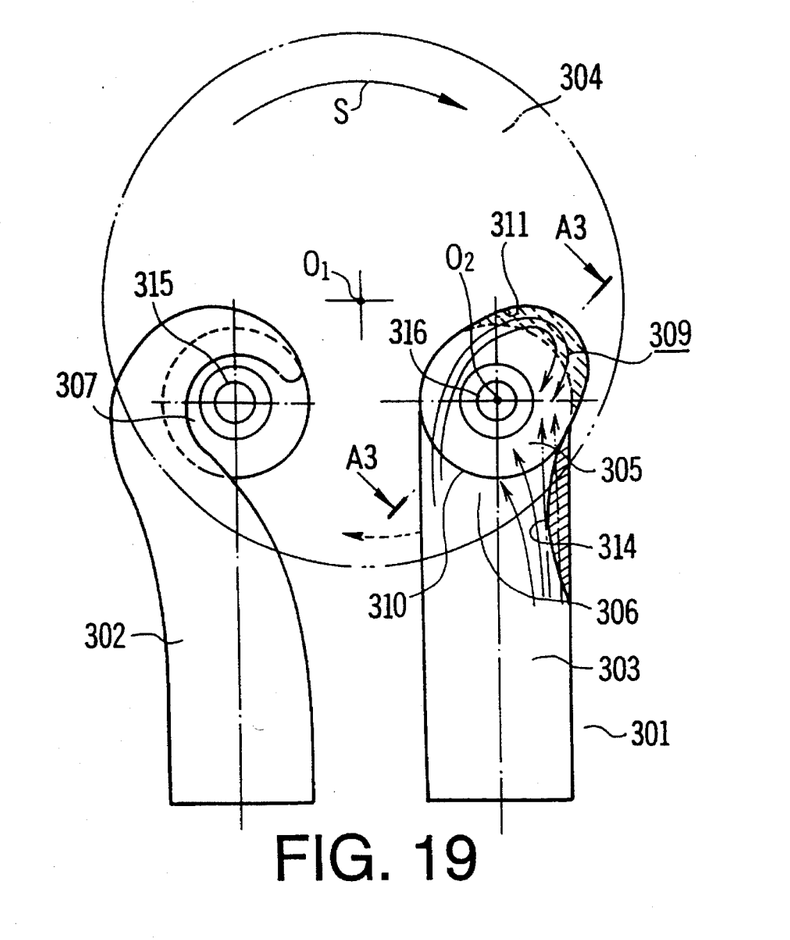
FIG. 19 illustrates a cylinder head according to a third embodiment of the present invention.

Referring to FIG. 19, a cylinder head 301 has a first intake port 302 extending in a direction perpendicular to a longitudinal direction of a crankshaft (not shown) or a direction of cylinders arranged in an engine and a second intake port 303 extending substantially parallel to the first intake port 302. The first intake port 302 has a helical port (or is a helical port) to generate a clockwise swirl S in a cylinder 304 (referred to as "normal swirl") as an air (intake air or combustion air) is taken into the cylinder 304. The second intake port 303 is a straight port and has a tangential portion 306 at its downstream end to cause a necessary amount of intake air to enter and rotate in the cylinder 304. The second intake port opening 305 opens to the cylinder 304. Numeral 307 designates an exit opening of the first intake port 302 which opens in a bottom face of the cylinder head 301. The exit opening 307 of the first intake port 302 opens downstream of the exit opening 305 of the second intake port 303 in the flowing direction of the normal swirl S. "01" designates a center of the cylinder 304 and "02" designates a center of the second intake port opening 305.

The tangential port 306 has a recess 309 to correct (or reverse) the direction of the intake air entering the tangential port 306. Specifically, the recess 309 is formed to cause the intake air to flow as a normal swirl S.

Figure 20:
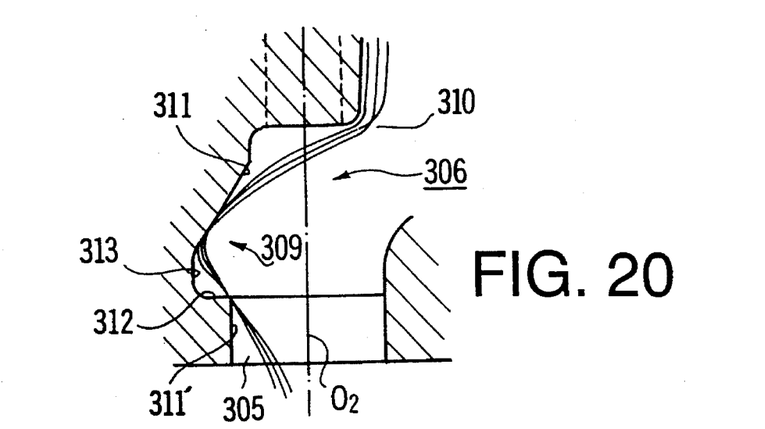
FIG. 20 is a sectional view taken along the line A3—A3 of FIG. 19, illustrating a recess shown in FIG. 19.

Details of the recess 309 are illustrated in FIG. 20. The recess 309 is formed by making a depression in a wall of the tangential port 306 near its downstream end. The recess 309 is generally defined by a lateral wall 311 continuous from the tangential port entrance 310, a bottom wall 312 inwardly and horizontally extending to a downstream end wall 311' and a curved wall 313 connecting the bottom wall 312 with the lateral wall 311. The recess 309 terminates before the opening 305 of the second intake port 303 (it terminates leaving a downstream end wall 311'). A depth of the recess 309 increases in the direction which the intake air flows in the tangential port 306. Specifically, the recess 309 is shallowest at the beginning of the recess 309 and deepest at the end 312 of the recess 309. In other words, the recess 309 is similar to a right-angled triangle in section.

Referring back to FIG. 19, a projection 314 is formed on a right side wall of the second intake port 302 upstream of the recess 309 or the tangential port 306. The projection 314 causes the intake air flowing along the right side wall of the second intake port 302 to deviate to the left (or toward the center 01 of the cylinder 304).

According to this construction, as an air is taken into the second intake port 303, it is generally deviated to the left on its way to the tangential port 306. The deviated flow of air enters the tangential port 306 and flows in the tangential port 306 (or the recess 309) from the left side wall of the tangential port 306. The flowing direction of the intake air is reversed (from a reverse swirl direction to a normal swirl direction) in the recess 309. As a result, the intake air leaves the second intake port 303 from its opening 305 and enters the cylinder 304 in the form of normal swirl S. Since the intake air is deviated to the left before it enters the tangential port 306, it does not intervene with the air in the tangential port 306. Accordingly, a swirl generated in to tangential port 306 is not attenuated by the intake air flowing in the second intake port 303 so that a strong normal swirl is generated in the tangential port 306 and in turn a strong normal swirl is introduced to the cylinder 304 from the second intake port 303. Since no masking plate or shroud is provided, no throttling loss occurs in the second intake port 303. Thus, a necessary amount of intake air is fed into the cylinder 304. If the projection 312 was not provided, the air would flow straight along the right side wall of the second intake port 303 as indicated by the broken-line arrows. Such a flow would conflict with the reversed flow of air in the recess 309 and attenuate the clockwise swirl to be generated by the recess 309.

A glow plug (not shown) is located between the first and second intake ports 302 and 303. Unlike the second embodiment, there is a sufficient space for the glow plug between the first and second intake ports 302 and 303 since the second intake port 303 extends straight.

The configuration of the tangential port 306 (e.g., preferable ranges of H/D, E/D, R/D and C/E) is substantially the same as that of the swirl generator 106 of the first embodiment so that explanation thereof is omitted here.

We claim:

1. An engine having at least one cylinder and first and second intake ports for each cylinder, the first and second intake ports being formed in a cylinder head, a combustion chamber being defined in the cylinder, the first and second intake ports substantially extending parallel to each other and perpendicular to the longitudinal direction of a crankshaft of the engine, downstream ends of the first and second intake ports opening to the combustion chamber respectively, air being sucked into the first and second intake ports during an intake stroke respectively, first and second swirls being generated in the first and second intake ports respectively, and the downstream end of the first intake port opening in the combustion chamber downstream of the downstream end of the second intake port in the flow direction of the first swirl, characterized in that the first intake port is a helical port to generate the first swirl, and a recess is formed in a wall of the second intake port near the downstream end of the second intake port to reverse the flow direction of the air in the second intake port such that the second swirl flows in the same direction as the first swirl in the combustion chamber, the recess being generally defined by a relatively long oblique side and a relatively short bottom side so that the recess forms a substantially right-angled triangle in section, and the short bottom side extends substantially parallel to a bottom face of the cylinder head, the short bottom including a flat portion, the ratio of a length (C) of the flat portion to a length (E) of the short bottom is equal to or greater than 0.1.

2. The engine of claim 1, wherein the short bottom side is inclined at a predetermined angle relative to the bottom face of the cylinder head in its front view.

3. The engine of claim 2, wherein the inclined short bottom side is bent downward in its front view.

4. The engine of claim 1, wherein the ratio of a length (E) of the short bottom side of the recess to a diameter (D) of the downstream end opening of the second intake port is greater than 0.1 but not greater than 0.4.

5. The engine of claim 1, wherein the oblique side is connected with the bottom side by a curvature, and a ratio of a radius (R) of the curvature to a diameter (D) of the downstream end opening of the second intake port is not greater than 0.2.

6. The engine of claim 1, wherein the second intake port generally extends straight.

7. The engine of claim 1, wherein the first swirl rotates clockwise, the center line of the second intake port is offset left relative to the center of the downstream end opening of the second intake port so that most of the air in the second intake port flows in a left half of the recess and rotates clockwise in the recess.

8. The engine of claim 1, wherein the second intake port is a tangential port.

9. An engine having at least one cylinder and first and second intake ports for each cylinder, the first and second intake ports being formed in a cylinder head, a combustion chamber being defined in the cylinder, the first and second intake ports substantially extending parallel to each other and perpendicular to the longitudinal direction of a crankshaft of the engine, downstream ends of the first and second intake ports opening to the combustion chamber respectively, air being sucked into the first and second intake ports during an intake stroke respectively, first and second swirls being generated in the first and second intake ports respectively, and the downstream end of the first intake port opening in the combustion chamber downstream of the downstream end of the second intake port in the flow direction of the first swirl, characterized in that the first intake port is a helical port to generate the first swirl, and a recess is formed in a wall of the second intake port near the downstream end of the second intake port to reverse the flow direction of the air in the second intake port such that the second swirl flows in the same direction as the first swirl in the combustion chamber, the recess being generally defined by a relatively long oblique side and a relatively short bottom side so that the recess forms a substantially right-angled triangle in section and the short bottom side extends substantially parallel to a bottom face of the cylinder head, the ratio of a distance (H) from the bottom face of the cylinder head to the bottom side of the recess to a diameter (D) of the downstream end opening of the second intake port is greater than 0.1 but not greater than 0.3.

10. An engine having at least one cylinder and first and second intake ports for each cylinder, the first and second intake ports being formed in a cylinder head, a combustion chamber being defined in the cylinder, the first and second intake ports substantially extending parallel to each other and perpendicular to the longitudinal direction of a crankshaft of the engine, downstream ends of the first and second intake ports opening to the combustion chamber respectively, air being sucked into the first and second intake ports during an intake stroke respectively, first and second swirls being generated in the first and second intake ports respectively, and the downstream end of the first intake port opening in the combustion chamber downstream of the downstream end of the second intake port in the flow direction of the first swirl, characterized in that the first intake port is a helical port to generate the first swirl, and a recess is formed in a wall of the second intake port near the downstream end of the second intake port to reverse the flow direction of the air in the second intake port such that the second swirl flows in the same direction as the first swirl in the combustion chamber, the recess being generally defined by a relatively long oblique side and a relatively short bottom side so that the recess forms a substantially right-angled triangle in section, and the short bottom side extends substantially parallel to a bottom face of the cylinder head, the wall of the second intake port extending straight from the bottom face of the cylinder head to the bottom side of the recess.

11. An engine having at least one cylinder and first and second intake ports for each cylinder, the first and second intake ports being formed in a cylinder head, a combustion chamber being defined in the cylinder, the first and second intake ports substantially extending parallel to each other and perpendicular to the longitudinal direction of a crankshaft of the engine, downstream ends of the first and second intake ports opening to the combustion chamber respectively, air being sucked into the first and second intake ports during an intake stroke respectively, first and second swirls being generated in the first and second intake ports respectively, and the downstream end of the first intake port opening in the combustion chamber downstream of the downstream end of the second intake port in the flow direction of the first swirl, characterized in that the first intake port is a helical port to generate the first swirl, and a recess is formed in a wall of the second intake port near the downstream end of the second intake port to reverse the flow direction of the air in the second intake port such that the second swirl flows in the same direction as the first swirl in the combustion chamber, the recess being generally defined by a relatively long oblique side and a relatively short bottom side so that the recess forms a substantially right-angled triangle in section, and the short bottom side extends substantially parallel to a bottom face of the cylinder head, and wherein the first swirl rotates clockwise, the second intake port extends straight in its upstream half along a center line (X) directed toward the center ($O_2$) of the downstream opening of the second intake port and bends left of the center line (X) in a downstream half such that most of the air in the second intake port flows in a left half of the recess and rotates clockwise in the recess.

12. An engine having at least one cylinder and first and second intake ports for each cylinder, the first and second intake ports being formed in a cylinder head, a combustion chamber being defined in the cylinder, the first and second intake ports substantially extending parallel to each other and perpendicular to the longitudinal direction of a crankshaft of the engine, downstream ends of the first and second intake ports opening to the combustion chamber respectively, air being sucked into the first and second intake ports during an intake stroke respectively, first and second swirls being generated in the first and second intake ports respectively, and the downstream end of the first intake port opening in the combustion chamber downstream of the downstream end of the second intake port in the flow direction of the first swirl, characterized in that the first intake port is a helical port to generate the first swirl, and a recess is formed in a wall of the second intake port near the downstream end of the second intake port to reverse the flow direction of the air in the second intake port such that the second swirl flows in the same direction as the first swirl in the combustion chamber, the recess being generally defined by a relatively long oblique side and a relatively short bottom side so that the recess forms a substantially right-angled triangle in section, and the short bottom side extends substantially parallel to a bottom face of the cylinder head, and wherein the center line (X) of the second intake port is offset left from the direction toward the center ($O_2$) of the downstream end opening of the second intake port so that most of the air in the second intake port flows in a left half of the recess and rotates clockwise in the recess, the amount of the offset being about one third of a diameter of the downstream end opening of the second intake port.

13. An engine having at least one cylinder and first and second intake ports for each cylinder, the first and second intake ports being formed in a cylinder head, a combustion chamber being defined in the cylinder, the first and second intake ports substantially extending parallel to each other and perpendicular to the longitudinal direction of a crankshaft of the engine, downstream ends of the first and second intake ports opening to the combustion chamber respectively, air being sucked into the first and second intake ports during an intake stroke respectively, first and second swirls being generated in the first a second intake ports respectively, and the downstream end of the first intake port opening in the combustion chamber downstream of the downstream end of the second intake port in the flow direction of the first swirl, characterized in that the first intake port is a helical port to generate the first swirl, and a recess is formed in a wall of the second intake port near the downstream end of the second intake port to reverse the flow direction of the air in the second intake port such that the second swirl flows in the same direction as the first swirl in the combustion chamber, the recess being generally defined by a relatively long oblique side and a relatively short bottom side so that the recess forms a substantially right-angled triangle in section, and the short bottom side extends substantially parallel to a bottom face of the cylinder head, and wherein the first swirl rotates clockwise, the center of gravity of the second intake in its section is offset left from a center line (X) extending toward the center ($O_2$) of the downstream end opening of the second intake port so that most of the air in the second intake port is directed to a left half of the recess and rotates clockwise in the recess.

14. The engine of claim 13, wherein the second intake port is gently bent such that the second intake port approaches the first intake port.

15. An engine having at least one cylinder and first and second intake ports for each cylinder, the first and second intake ports being formed in a cylinder head, a combustion chamber being defined in the cylinder, the first and second intake ports substantially extending parallel to each other and perpendicular to the longitudinal direction of a crankshaft of the engine, downstream ends of the first and second intake ports opening to the combustion chamber respectively, air being sucked into the first and second intake ports during an intake stroke respectively, first and second swirls being generated in the first and second intake ports respectively, and the downstream end of the first intake port opening in the combustion chamber downstream of the downstream end of the second intake port in the flow direction of the first swirl, characterized in that the first intake port is a helical port to generate the first swirl, and a recess is formed in wall of the second intake port near the downstream end of the second intake port to reverse the flow direction of the air in the second intake port such that the second swirl flows in the same direction as the first swirl in the combustion chamber, the recess being generally defined by a relatively long oblique side and a relatively short bottom side so that the recess forms a substantially right-angled triangle in section, and the short bottom side extends substantially parallel to a bottom face of the cylinder head, and wherein the first swirl rotates clockwise, a projection is formed on a right side of the center line (X) of the second intake port upstream of the recess so that most of the air in the second intake port is deviated to a left of the center line (X) of the recess by the projection and rotates clockwise in the recess.

16. The engine of claim of claim 15, wherein the second intake port substantially extends straight.

\* \* \* \* \*

UNITED STATES PATENT AND TRADEMARK OFFICE
CERTIFICATE OF CORRECTION

PATENT NO. : 5,479,889
DATED : January 2, 1996
INVENTOR(S) : Hiromi Sato, et al

It is certified that error appears in the above-indentified patent and that said Letters Patent is hereby corrected as shown below:

Column 9, line 42, please delete " (not shown)".

Signed and Sealed this

Twenty-ninth Day of April, 1997

Attest:

BRUCE LEHMAN

Attesting Officer

Commissioner of Patents and Trademarks